United States Patent Office 2,855,343
Patented Oct. 7, 1958

2,855,343

16α HYDROXYLATION STEROIDS

Josef Fried and David Perlman, Princeton, and Asger F. Langlykke, Plainfield, N. J., and Elwood O. Titus, Kensington, Md., assignors to Olin Mathieson Chemical Corporation, New York, N. Y., a corporation of Virginia No Drawing. Application June 4, 1958
Serial No. 739,943

8 Claims. (Cl. 195—51)

This application is a continuation-in-part of Serial No. 453,411, filed August 31, 1954, which in turn is a continuation-in-part of Serial No. 239,018, filed July 27, 1951, and now Patent No. 2,709,705, granted May 31, 1955.

This invention relates to, and has for its object the improvement of a method of producing medicinal agents (or intermediates for medicinal agents) from steroids by microbiological action, and to the medicinal agents produced thereby.

Prior to this invention, attempts had been made to convert steroids into medically-useful substances by utilizing the activity of growing microorganisms, but with generally unsatisfactory results from the standpoints of utility of the substance produced and/or efficiency of its production. Thus, the prior attempts resulted either in oxidation of hydroxy groups to keto groups (as in the conversion of dehydroepiandrosterone to androstenedione) or rupture of the steroid nucleus, rather than the desired addition of oxygen to the steroid nucleus.

It has been found that steroids having a methylene group in the 16-position, especially 3-keto or 3-hydroxy steroids, or protected derivatives thereof, either of the androstane (including etiocholane and androstene) series or pregnane (including allopregnane and pregnene) series, the 3,20-diketo steroids of the pregnane series being particularly preferred, can be converted into useful 16α-hydroxy derivatives by subjecting them to the action of enzymes of special microorganisms or to the action of the organisms themselves under oxidizing and preferably aerobic conditions.

It has further been discovered that the 16α-hydroxy derivatives, thus formed, which are in many instances themselves new compounds, are useful as starting materials in new processes for preparing both known and new steroid derivatives. Aside from their use as intermediates as disclosed in Patent No. 2,709,705, all the 16α-hydroxy steroids produced by the method of this invention may be oxidized to the corresponding useful 16-keto derivatives, as disclosed in the application of Herz et al., Serial No. 453,433, filed August 31, 1954. 16α-hydroxyprogesterone is further useful as a starting material in the preparation of the known steroids: allopregnane-3,6,20-trione and pregnane-3,11,20-trione. 16α-hydroxy-11-desoxycorticosterone is a useful starting material in the preparation of Δ⁴-androstene-3,16-dione, a new steroid which is a protein anabolic agent, as disclosed in said Serial No. 453,433. The 16α-hydroxy-Δ⁴-androstene-3,17-dione and 16α-hydroxytestosterone formed by the instant process are new steroids which have androgenic activity; the former further useful as a starting material in the production of Δ⁴-3-ketoetiobilienic acid dimethyl ester which is a new steroid derivative.

Among the steroids which may be oxidized by the practice of this invention are those steroids unsubstituted in the 16-position, which are members of: the androstane series, which series includes the androstene and etio-cholane series; and the pregnane series, which series includes the pregnene and allopregnane series. Of these, the steroids of the pregnane series and more particularly the 3,20-diketo steroids of the pregnane series are preferred. Examples of suitable steroids of the pregnane series include progesterone; pregnenolone; pregnanolone; hydroxylated progesterone, such as 2α, 6α, 6β, 7, 8, 9, 11α, 11β, 12α, 14, 15α, and 15β-hydroxyprogesterone; halogenated progesterone, such as 21-chloroprogesterone; aldosterone; corticosterone; 11-desoxycorticosterone; 17α-hydroxy-11-desoxycorticosterone (Reichstein's compound S); hydrocortisone (compound F); and the esters thereof; particularly the carboxylic acid esters such as the fatty acid esters (e. g. acetate, propionate, and butyrate) and the aromatic acid esters (e. g. benzoate and naphthoate). As indicated before, however, although the preferred starting materials are steroids of the pregnane series, the process of this invention is a general one which may be employed to 16α-hydroxylate other classes of steroids such as those of the androstane series as exemplified by Δ⁴-androstene-3,17-dione and testosterone.

Among the steroids formed by the process of this invention are the 16α-hydroxy derivatives of the pregnane series, preferably of the 16α-hydroxy-3,20-diketo-steroids of the pregnane series. Examples of resulting products of the 16α-hydroxy pregnane series include 16α-hydroxyprogesterone; the 16α-hydroxy derivatives of hydroxylated progesterone; the 16α-hydroxy derivatives of halogenated progesterone; 16α-hydroxy-aldosterone; 16α-hydroxycorticosterone; 16α-hydroxy-11-desoxycorticosterone; 16α, 17α-dihydroxy-11-desoxycorticosterone; 16α-hydroxy-hydrocortisone; and the esters thereof. If a steroid of the androstane series is hydroxylated, the 16α-hydroxy derivative is also formed as exemplified by 16α-hydroxy-Δ⁴-androstene-3,17-dione and 16α-hydroxytestosterone.

As before stated, the preferred final products are the 16α-hydroxy-3,20-diketo derivatives of the pregnane series which may be represented by the following general formula:

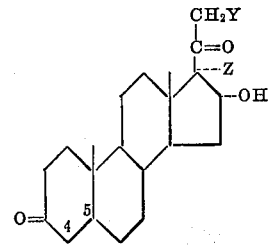

wherein the 4,5-position is double-bonded or saturated (the 4,5-double-bonded steroids are preferred), and wherein Z is hydrogen or α-hydroxy; and Y is hydrogen, hydroxy, halogen, or RO, wherein R is an acyl radical such as a fatty acid radical (e. g. acetyl, propionyl, benzoyl, and naphthoyl) or a hydrocarbon radical, such as an alkyl radical (e. g. methyl, ethyl and butyl) or an aralkyl radical (e. g. benzyl and phenethyl).

The microorganisms useful for this process include certain Streptomyces. Representative of the Streptomyces which are usable as microbiological oxidants are S. roseochromogenus, S. viridis, S. olivaceus and Streptomyces argenteolus ATCC 11,009. Streptomyces argenteolus is a new species of microorganism which, when grown on agar, has mature vegetative hyphae whose diameter varies from 0.9 to 1.2 microns. The aerial mycelium is hyaline under the microscope, generally branched, not forming loops or spirals. Individual filaments are rarely or not septate. The color of colonies when viewed on agar without magnification is white to light gull gray (Ridgway plate L III 10f). The spores are oval to oblong. Mature spores range from about 1.0 to 1.2 microns in diameter and from 1.0 to 1.2 microns in length. Individual spores are colorless at maturity, but in mass appear white to gray when viewed without magnification (Ridgway plate L III 10f).

The microorganism will liquefy gelatine, peptonize litmus milk, reduce nitrate to nitrite, and produce hydrogen sulfide when grown on Kligler iron agar. It does not produce indole when grown on tryptone agar. It will grow on media containing ammonium sulfate, or sodium nitrate, or asparagine, or tryptophane as sole source of nitrogen (basal medium: $KH_2PO_4$, 2.38 g.; $K_2HPO_4$, 5.65 g.; $MgSO_4 \cdot 7H_2O$, 1.0 g.; $CuSO_4 \cdot 5H_2O$, 0.0064 g.; $FeSO_4 \cdot 7H_2O$, 0.0011 g.; $MnSO_4 \cdot 4H_2O$, 0.0079 g.; $ZnSO_4 \cdot 7H_2O$, 0.0015 g.; agar (Difco), 15 g.; glucose, 10 g.; water to 1 liter; pH adjusted to 6.8). When the same basal medium without carbohydrate but with 0.106 g. N [as $(NH_4)_2SO_4$] is used, no growth is obtained. Addition of the following sugars (at 10 g./l.) supports growth: arabinose, rhamnose, glucose, galactose, fructose, mannose, lactose, maltose, dextrin, starch, glycerol, mannitol, salicin. No growth is noted when sucrose, raffinose, sorbose, sorbitol or inositol are added to the basal medium. Sodium acetate and sodium citrate support growth when added to the basal medium, but sodium tartrate does not.

*Streptomyces griseus* is the species most closely related to *Streptomyces argenteolus*. Morphologically *Streptomyces argenteolus* resembles *Streptomyces griseus* in its production of sporophores which are straight, flexous, or facicled (in tufts). The spore color of *Streptomyces griseus* is water green, that of *Streptomyces argenteolus* is light gull gray. Physiologically, the cultures differ as indicated in the following table:

|  | S. argenteolus | S. griseus 4W (Streptomycin strain) |
| --- | --- | --- |
| Spore color | Light gull gray | Water green. |
| Carbon Utilization. | Adonitol−, Trehalose+, Na Acetate+. | Adonitol+, Trehalose−, Na Acetate+. |
| Antibiotic Production. | M 2428 BuOH soluble antibiotics. | Streptomycin. |
| Phage Sensitivity. | Resistant | Sensitive. |

The action of the enzymes of these microorganisms to produce useful derivatives of steroids can be utilized either by including the steroid in an aerobic culture of the microorganism, or by bringing together, in an aqueous medium, the steroid, air, and enzymes of non-proliferating cells of the microorganism. Thus, for example, when supplemented with progesterone, a culture of the microorganism forms the useful 16α-hydroxy derivative thereof as disclosed in Patent No. 2,709,705. Similarly, the action of the organisms on desoxycorticosterone yields the 16α-hydroxy derivative.

In general, the conditions of culturing the Streptomyces for the purposes of this invention are (except for the inclusion of the steroid to be converted) the same as those of culturing various Streptomyces for the production of anti-biotics and/or vitamin B–12, i. e., the microorganism is aerobical grown in contact with (in or on) a suitable fermentation medium. A suitable medium essentially comprises a source of nitrogenous and growth-promoting factors, and an assimilable source of carbon and energy. The latter may be a carbohydrate and/or the steroid itself. Preferably, however, the medium includes an assimilable source of carbon and energy in addition to the steroid; and preferably also, this source is at least in substantial part a member of the group consisting of (1) fatty acids having at least 14 carbon atoms and (2) fats. Use of such lipid source of carbon and energy (especially use of a fatty oil) is advantageous in that it enhances the availability of the steroid for conversion.

The nitrogen source materials may be organic (e. g. soybean meal, cornsteep liquor, meat extract, and/or distillers solubles) or synthetic (i. e. composed of simple, synthesizable organic or inorganic compounds such as ammonium salts, alkali nitrates, amino acids, urea or thiourea).

As to the energy source material, lipids, especially (1) fatty acids having at least 14 carbon atoms, (2) fats or (3) mixtures thereof, are preferred. Examples of such fats are lard oil, soybean oil, linseed oil, cottonseed oil, peanut oil, fancy mutton tallow, sperm oil, olive oil, tristearin, tripalmitin, triolein and trilaurein; and illustrative fatty acids include stearic, palmitic, oleic, linoleic and myristic acids.

Other carbon-containing materials may also be used. For example, such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The media may contain other precursors in addition to the steroids to obtain other valuable products. For example, an assimilable source of cobalt may be included where a vitamin B–12 is desired, and the by-product then recovered by conventional methods.

The following examples are illustrative of the invention:

EXAMPLE 1

*Conversion of progesterone to 16α-hydroxyprogesterone by fermenation with* Streptomyces argenteolus *ATCC 11,009*

An aqueous medium of the following composition is prepared:

| | |
| --- | --- |
| Soybean oil ml | 8.8 |
| Progesterone g | 0.25 |
| Soybean meal g | 30 |
| $Co(NO_3)_2 \cdot 6H_2O$ g | 0.005 |
| Water liter | 1 |

100 ml. portions of the medium are distributed in 500 ml. Erlenmeyer flasks, and the flasks are plugged with cotton and sterilized in the usual manner (by autoclaving). When cool, each of the flasks is inoculated with 2% of a vegetative inoculum of *Streptomyces argenteolus* ATCC 11,009 which has been grown for 48–75 hours on a soybean meal-glucose medium, and the flasks are maintained at 25° C. and mechanically shaken. After three days of incubation, the medium has a pH of about 6.3, a vitamin B–12 content of about 0.15 microgram/ml., a progesterone content of about 106 micrograms/ml., and a 16α-hydroxyprogesterone content of about 115 micrograms/ml. The presence and quantity of 16α-hydroxyprogesterone and unoxidized progesterone is determined by extracting the sample with chloroform, separating the oxidized compound from progesterone using the filter paper partition chromatographic method of Zaffaroni (Science III: 6, 1950; propylene glycol-toluene system) and determining the quantity of steroid in each "spot" using a quartz spectrophotometer (240 m$\mu$). The oxidized steroid appears to predominate in the cell-free filtrate while the unoxidized steroid is associated with the cells of the microorganism.

The 16α-hydroxyprogesterone is recovered from the culture filtrate as described hereinafter.

EXAMPLE 2

(*a*) An aqueous medium of the following composition is prepared, and distributed, sterilized, inoculated with 2% of a vegetative inoculum of *Streptomyces argenteolus* ATCC 11,009, and incubated as described in Example 1:

| | | |
|---|---|---|
| Soybean oil | ml | 2.2 |
| Progesterone | g | 0.25 |
| Glycine | g | 2.6 |
| Sodium acid glutamate | g | 2.2 |
| $FeSO_4 \cdot 7H_2O$ | g | 0.025 |
| $ZnSO_4 \cdot 7H_2O$ | g | 0.03 |
| $CuSO_4 \cdot 5H_2O$ | g | 0.012 |
| $Co(NO_3)_2 \cdot 6H_2O$ | g | 0.005 |
| $MnSO_4 \cdot 4H_2O$ | g | 0.016 |
| $CaCl_2 \cdot 2H_2O$ | g | 0.05 |
| $MgSO_4 \cdot 7H_2O$ | g | 0.5 |
| $K_2HPO_4 \cdot 3H_2O$ | g | 0.5 |
| Water | liter | 1 |

(b) After three days incubation, the unfiltered medium from 700 flasks is pooled, and centrifuged; and the clear liquid is extracted with thirteen 4-liter portions of chloroform. The chloroform extract is evaporated to dryness in vacuo, and the residue (about 31 g.) is mixed with 400 ml. of 80% methanol. The resulting suspension is extracted with seven 400 ml. portions of hexane (which removes all the lipids and leaves the essentially pure oxidized steroids in the aqueous methanol phase). The aqueous methanol phase is evaporated, leaving about 8.7 g. of a semi-crystalline mixture; and the latter is dissolved in 50 ml. chloroform and 50 ml. benzene, and chromatographed on a column (7 cm. diameter) containing 800 g. of a mixture of equal volumes magnesium silicate and a filter aid (e. g., Celite); and the column (X) is then washed with a mixture of equal volumes of chloroform and benzene. At first, residual progesterone is eluted, followed by a small fraction of crystalline material (Y), and then by the main product of the fermentation, 16α-hydroxyprogesterone, which is recovered from the eluate by evaporation of the solvents and then crystallized from acetone.

The 16α-hydroxyprogesterone forms hexagonal crystals melting at 225–6° C. It gives a blue coloration with iodine and KI solution on filter paper. $[\alpha]_D^{23} +158°$ (C, 0.38 in chloroform). U. V.:

$$\lambda_{max.}^{alc.} \ 239 \ m\mu$$

($\epsilon$=17,000). I. R.:

$$\lambda_{max.}^{Nujol} \ 3.04\mu$$

(hydroxyl); 5.90μ (20-keto); 6.05μ and 6.20μ (3-keto, Δ^{4,5}). Its analysis (C, 76.61; H, 9.56) is in good agreement with that calculated for $C_{21}H_{30}O_3$.

Acetylation of 16α-hydroxyprogesterone with acetic anhydride and pyridine yields a monoacetate, which on crystallization from acetone and hexane melts at 134–5° C., and has $[\alpha]_D^{22} +107°$ C., and gives the following figures on analysis: C, 73.65; H, 8.61; and acetyl, 11.63. Esters of 16α-hydroxyprogesterone with other organic acids (e. g., benzoic acid) may be obtained analogously.

The crystalline material Y obtained from the second eluate by evaporation of the solvent and repeated crystallization from acetone melts at 199–200° C., and has the characteristics following: $[\alpha]_D^{23} +90.5°$ (C, 0.82 in chloroform). U. V.:

$$\lambda_{max.}^{alc.} \ 284 \ m\mu$$

($\epsilon$=65). Analysis: C, 76.12; H, 9.73 (in good agreement with that calculated for $C_{21}H_{32}O_3$). The product represents 16α-hydroxypregnane-3,20-dione. It may be converted into its acetate (or other ester) in the same manner as 16α-hydroxyprogesterone.

Further elution of the silicate-filter aid column X with pure chloroform yields an additional quantity of 16α-hydroxyprogesterone. The column is then further eluted with a mixture of three parts chloroform and one part acetone; and the solvent is removed from this eluate by evaporation and the residue crystallized from acetone.

The product melts at 215.5–216.5° C., and has the following characteristics: $[\alpha]_D^{24} -39°$ (chloroform); U. V., $$\lambda_{max.}^{alc.} \ 243 \ m\mu$$

($\epsilon$=14,400). Its analysis (C, 73.09; H, 8.68) is in good agreement with that calculated for $C_{21}H_{30}O_4$, the product being believed to be a dihydroxyprogesterone with one of the hydroxy group in 16-position.

EXAMPLE 3

Example 1 is repeated using a medium of the following composition:

| | | |
|---|---|---|
| Soybean oil | ml | 8.8 |
| Progesterone | g | 0.25 |
| Dried brewers' yeast | g | 25.0 |
| $Co(NO_3)_2 \cdot 6H_2O$ | g | 0.005 |
| Water | liter | 1 |

After two days incubation, the medium has a pH of about 6.3, a vitamin B-12 content of about 0.20 microgram/ml., and a 16α-hydroxyprogesterone content of about 130 micrograms/ml. (about 120 micrograms/ml. in the culture filtrate).

EXAMPLE 4

Example 1 is repeated using a medium of the following composition:

| | | |
|---|---|---|
| Soybean oil | ml | 8.8 |
| Progesterone | g | 0.25 |
| $Co(NO_3)_2 \cdot 6H_2O$ | g | 0.005 |
| Cornsteep liquor (neutralized to pH 7) | g | 40 |
| $CaCO_3$ | g | 5 |
| Water | liter | 1 |

After three days' incubation, the medium has a pH of about 6.5, a vitamin B-12 content of about 0.21 microgram/ml., and a 16α-hydroxyprogesterone content of about 95 micrograms/ml. (about 85 micrograms/ml. in the culture filtrate).

On incubating for four days, both the vitamin B-12 and 16α-hydroxyprogesterone titers of the medium are materially increased. Thus, on extension of the incubation in Example 3, to four days, the vitamin B-12 content is raised to 0.43 microgram/ml., and the 16α-hydroxyprogesterone content to 150 micrograms/ml. (140 micrograms/ml. in the culture filtrate).

In some cases, a further increase in titer may be obtained on further extension of the incubation period. Thus, on extension of the incubation in Example 4, to 7 days, the 16α-hydroxyprogesterone content is raised to 180 micrograms/ml. (175 micrograms/ml. in the culture filtrate).

In the examples given hereinbefore, the steroid precursor is progesterone; but other steroid precursors can be converted into useful steroid derivatives, as illustrated by the following examples:

EXAMPLE 5

*Conversion of compound S acetate to its oxidized derivative by fermentation with Streptomyces argenteolus ATCC 11,009.*

(a) 3 g. compound S acetate is incorporated in 15 liters of a soybean oil medium of the following composition:

| | | |
|---|---|---|
| Glycine | g | 2.6 |
| Sodium acid glutamate | g | 2.2 |
| $MgSO_4 \cdot 7H_2O$ | g | 0.5 |
| $K_2HPO_4 \cdot 3H_2O$ | g | 0.5 |
| $ZnSO_4 \cdot 7H_2O$ | g | 0.03 |
| $MnSO_4 \cdot 4H_2O$ | g | 0.016 |
| $CuSO_4 \cdot 5H_2O$ | g | 0.012 |
| $FeSO_4 \cdot 7H_2O$ | g | 0.025 |
| $CaCl_2 \cdot H_2O$ | g | 0.05 |
| Soybean oil | g | 2.2 |
| Water | liter | 1 |

The medium is then inoculated with *Streptomyces argenteolus* ATCC 11,009 and incubated in a shake flask as described hereinbefore for 4 days. The unfiltered medium is extracted with three 15-liter portions of chloroform, and the solvent evaporated from the extract; and the residue is taken up in 4 liters benzene, and the benzene solution (W) is extracted eight times with 8-liter portions of water. The aqueous phase (Z) is then extracted with 6.4 liters benzene (extract W'); and the benzene extracts W and W' are combined, the benzene removed by evaporation, and the residue recrystallized from alcohol, yielding about 1.1 g. of recovered crude compound S acetate.

(b) The aqueous phase Z is extracted with chloroform, the chloroform is evaporated from the extract and the residue is taken up in hot 95% ethanol. On standing, a precipitate is formed, the product melting at about 208–13° C.; and an additional yield of the product is obtained by evaporating the mother liquor to half-volume. Repeated recrystallization from ethanol yields the product as characteristic diamond-shaped platelets melting at about 224–7° C. Acetylation of the product in pyridine-acetic anhydride yields needles melting at 209–11° C. $[\alpha]_D^{25}-58°$ (0.53% in chloroform). Analysis: C, 67.5; H, 8.08. The product appears to be a hydroxy derivative of compound S.

EXAMPLE 6

*Conversion of desoxycorticosterone acetate to 16α-hydroxy-desoxy-corticosterone by fermentation with Streptomyces argenteolus ATCC 11,009.*

1 g. desoxycorticosterone acetate is incorporated in 5 liters of the soybean oil medium described in Example 5 and the medium is inoculated and incubated as described in that example for 5 days. The unfiltered medium is extracted with three 5-liter portions of chloroform, the solvent evaporated from the extract, and the residue partitioned between benzene and water. On further purification, the aqueous phase yields an oxidized derivative of desoxycorticosterone, as indicated by mobility in filter-paper partition chromatography using Zaffaroni's methods.

Said one gram of desoxycorticosterone acetate yields about 685 mg. of crude steroids. Chromatography on 17 g. of silica gel yields in the benzene-chloroform 1:1, chloroform and 5% acetone in chloroform eluates an amorphous material. Elution with 10% acetone in chloroform affords a crystalline fraction (about 130 mg.) from which pure 16α-hydroxy-11-desoxycorticosterone, having the structural formula:

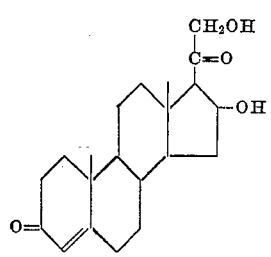

is isolated in about 4% yield (based on the starting material), M. P. 202–203° C.; $[\alpha]_D^{23}+130°$ (C, 0.40 in chloroform). Its infrared spectrum is identical with that of a sample prepared by fermentation with *S. roseochromogenus* (Waksman No. 3689) (see Example 14).

Subsequent elution of the column with 20% acetone in chloroform affords about 150 mg. of material, which after repeated crystallization from acetone melts at 215–217° C.; $[\alpha]_D^{23}+44°$ (c, 0.23 in chloroform). No absorption at 240mμ;

$\lambda_{max.}^{Nujol}$ 2.98μ

(OH), 5.88μ (keto-carbonyl).

The substance probably represents 4,5-dihydro-16α-hydroxy-11-desoxycorticosterone, which has the structural formua:

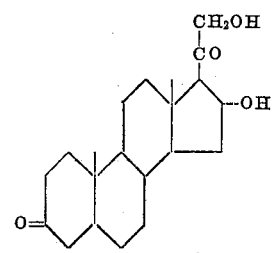

10 mg. of this material is acetylated with pyridine-acetic anhydride. The resulting acetylation product after crystallization from ether-hexane melts at 130–132° C. and has $[\alpha]_D^{23}+55°$ (c, 0.36 in chloroform). Anal. calcd. for $C_{25}H_{36}O_6$: C, 69.42; H, 8.39. Found: C, 68.96; H, 8.46.

EXAMPLE 7

*Conversion of pregnenolone to its oxidized derivative by fermentation with Streptomyces argenteolus ATCC 11,009*

100 mg. pregnenolone is incorporated in 500 ml. of the soybean oil medium described in Example 5, and the medium is inoculated and incubated as described in that example for 3 days. The unfiltered medium is extracted once with 500 ml. chloroform and again with 250 ml. chloroform, and the extract further treated to yield a mixture of oxidized derivatives of pregnenolone, probably 16α-hydroxyprogesterone and progesterone (based on filter-paper partition chromatography).

EXAMPLE 8

*Conversion of androstenedione to 16α-hydroxy-Δ⁴-androstene-3,17-dione by fermentation with Streptomyces argenteolus ATCC 11,009*

Following the process of Example 5 with Δ⁴-androstene-3,17-dione substituted for compound S acetate, 16α-hydroxy-Δ⁴-androstene-3,17-dione, having the structural formula:

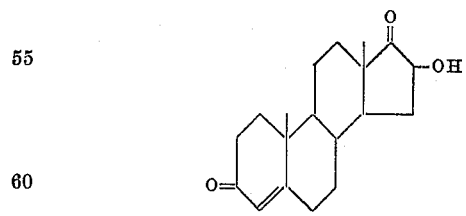

is produced. Its infrared spectrum is identical with that of sample prepared by fermentation with *S. roseochromogenus* (Waksman No. 3689) (see Example 17).

In the examples given hereinbefore, the steroid is included in the fermentation medium before inoculation with the microorganism; but the steroid may be added after the inoculation and even after substantial growth of the microorganism has occurred, as illustrated by the example following. Where an intermediate stage of oxidation is desired, as for example progesterone rather than 16α-hydroxyprogesterone, it is favored by a shorter fermentation period.

EXAMPLE 9

An aqueous medium of the following composition is prepared and distributed, sterilized, inoculated, and incubated as described in Example 1:

| | |
|---|---|
| Soybean meal _____ g.__ | 15 |
| Glucose _____ g.__ | 10 |
| Soybean oil _____ g.__ | 2 |
| Water _____ liter__ | 1 |

After incubating for one day, pregnenolone is added to each flask in the proportion of 200 mg./liter medium; and the medium is further incubated for six hours, and the pooled medium then extracted with three 1-liter portions of chloroform. The pooled chloroform extract contains about 190 mg. progesterone.

In the examples given hereinbefore, the steroid is converted by inclusion in an aerobic culture of the microorganism; but the conversion can also be effected by bringing together the steroid and air in an aqueous suspension of the non-propagating microorganism (or by bringing together the steroid, air and enzymes of the microorganism in an aqueous cell-free medium), as illustrated by the following example:

EXAMPLE 10

The two-day culture of *Streptomyces argenteolus* ATCC 11,009 described in Example 1 is centrifuged, resuspended in distilled water, recentrifuged, and again resuspended in distilled water. 40 ml. aliquots of the suspension are placed in 125 ml. Erlenmeyer flasks, 10 mg./liter of a polyoxyethylene ether of a partial higher fatty acid ester of sorbitan (e. g., Tween) and 200 mg./liter of pregnenolone are added to each flask, and the flasks are agitated (on a reciprocating shaker) at 25° C. for 24 hours. The pregnenolone added is almost quantitatively converted to progesterone, which may be recovered by chloroform extraction.

The foregoing examples all employed *Streptomyces argenteolus* ATCC 11,009 as the oxidizing organism. Other organisms may be used, however, as illustrated by the examples following.

EXAMPLE 11

*Conversion of progesterone to 16α-hydroxyprogesterone by fermentation with* Streptomyces roseochromogenus *(Waksman No. 3689)*

An aqueous medium of the following composition is prepared:

| | |
|---|---|
| Soybean meal nutrient _____ g.__ | 15.0 |
| Glucose _____ g.__ | 10.0 |
| Soybean oil _____ g.__ | 2.2 |
| Progesterone _____ g.__ | 0.5 |
| CaCO$_3$ _____ g.__ | 2.5 |
| Water _____ liter__ | 1 |

The pH of the medium is adapted to 7.0±0.1. 100 ml. portions of the medium are distributed in 500 ml. Erlenmeyer flasks. The flasks are plugged with cotton and sterilized in the usual manner (by autoclaving). When cool, each of the flasks is inoculated with 5–10% of a vegetative of *S. roseochromagenus* (Waksman No. 3689). The flasks are maintained at about 25° C. and mechanically shaken. After three days of fermentation, the contents of six flasks are pooled, acidified to a pH 4±0.2 with sulfuric acid and filtered in a Buchner funnel. The filtered broth is extracted with four 300 ml. portions of chloroform, yielding, after removal of the solvent in vacuo, about 200 mg. of crude steroids, which crystallize on standing. Recrystallization from ethanol yields about 30 mg. of pure 16α-hydroxyprogesterone, M. P. 223–225° C.; $[\alpha]_D+152°$ (c, 0.5 in chloroform) shown to be identical with an authentic sample by mixture melting point and infrared comparison.

EXAMPLE 12

*Conversion of progesterone to 16α-hydroxyprogesterone by fermentation with* Streptomyces viridis *(Waksman No. 3690)*

Following the process of Example 11, by substituting *S. viridis* (Waksman No. 3690) for *S. roseochromogenus*, 300 mg. of progesterone yield about 115 mg. of crude steroids. Chromatography on 2.3 g. of alumina furnishes in the 10% chloroform-90% benzene eluate 16α-hydroxyprogesterone which after recrystalization from ethanol melts at 224–226° C., $[\alpha]_D^{23}+152°$ (C, 0.50 in chloroform). The yield is about 45 mg. Its infrared spectrum is identical with that of an authentic sample.

EXAMPLE 13

*Conversion of progesterone to 16α-hydroxyprogesterone by fermentation with* Streptomyces olivaceus *(Waksman No. 3688)*

The fermentation and isolation steps are the same as Example 11 with *S. olivaceus* (Waksman No. 3688) substituted for *S. roseochromogenus*.

One gram of progesterone furnishes about 440 mg. of crude steroids which crystallize spontaneously. Recrystallization from acetone yields about 66 mg. melting at 218–220° C. This latter melting point is raised to 225–227° by successive crystallizations from the same solvent; $[\alpha]_D^{24}+158°$ (c, 0.645 in chloroform). The infrared spectrum of this material is identical with that of an authentic sample of 16α-hydroxyprogesterone.

EXAMPLE 14

*Conversion of desoxycorticosterone to 16α-hydroxy-11-desoxycorticosterone by fermentation with* Streptomyces roseochromogenus *(Waksman No. 3689)*

The aqueous medium was the same as that of Example 11 with 900 mg. of desoxycorticosterone substituted for the progesterone. The fermentation step is as in Example 11. The culture filtrate from 18 flasks are pooled and extracted four times with 900 ml. of chloroform. Evaporation of the chloroform leaves about 690 mg. of crude steroids, which after defatting by distribution between 20 ml. of hexane and 20 ml. of 80% aqueous methanol yields about 630 mg. of fat-free steroids. Repeated crystallization from acetone affords about 220 mg. of pure 16α-hydroxy-11-desoxycorticosterone which melts at 201–203° C.; $[\alpha]_D^{23}+129°$ (c, 0.39 in chloroform);

$$\lambda_{max.}^{alc.}\ 239\ m\mu$$

($\epsilon=18,700$) 290 m$\mu$ ($\epsilon=148$);

$$\lambda_{max.}^{Nujol}\ 2.91\mu$$

and 2.98$\mu$ (OH); 5.80$\mu$ (20-ketone), 6.04$\mu$ and 6.07$\mu$ ($\Delta^4$-3-ketone). Anal. Calcd. for $C_{21}H_{30}O_4$ (346.45) C, 72.88; H, 8.73. Found: C, 72.85; H, 8.87.

EXAMPLE 15

*Conversion of desoxycorticosterone to 16α-hydroxy-11-desoxycorticosterone by fermentation with* Streptomyces viridis *(Waksman No. 3690)*

Following the fermentation and isolation processes of Example 14 but substituting *S. viridis* (Waksman No. 3690) for *S. roseochromogenus*, a yield of about 34% of 16α-hydroxy-11-desoxycorticosterone results, as determined by quantitative-paper chromatographic comparison with 16α-hydroxy-11-desoxy-corticosterone in a benzene-ethanol-water system.

EXAMPLE 16

Following the fermentation and isolation process of Example 14, desoxycorticosterone is converted to 16α-hydroxy-11-desoxycorticosterone in 20% yield with *S. olivaceus* (Waksman No. 3688).

EXAMPLE 17

*Conversion of androstenedione to 16α-hydroxyandrostendione (16α-hydroxy-Δ⁴-androstene-3,17-dione) by fermentation with Streptomyces roseochromogenus*

Using a medium and method of Example 1 with androstenedione substituted for progesterone, 800 mg. of androstenedione is fermented with *S. roseochromogenus* for 66 hours.

The filtered broth is extracted with chloroform and about 789 mg. steroids and lipids are isolated. The crude product crystallizes and is triturated with hexane to remove lipids. Pure 16α-hydroxyandrostenedione (about 200 mg.) is obtained upon recrystallization from acetone-ether, M. P. 185–187° C., $[\alpha]_D+194°$ (c, 0.42 in chloroform $$\lambda_{max.}^{EtOH}\ 239\ m\mu$$

($\epsilon$=17,000), 300 m$\mu$ ($\epsilon$=145), $$\lambda_{max.}^{Nujol}\ 3.01\mu$$

5.72$\mu$, 6.08$\mu$, 6.22$\mu$. The compound gives a positive Tollen's test and a positive reaction with 2,4,5-triphenyltetrazolium chloride in methanolic KOH. On titration with sodium metaperiodate 1.09 moles of the reagent are consumed indicating the presence of one α-ketal group. Anal. $C_{19}H_{26}O_3$ (302.40): C, 75.46; H, 8.67. Found: C, 75.68; H, 8.59. Acetate: A solution of 16α-hydroxy-Δ⁴-androstene-3,17-dione (27 mg.) in 1 ml. dry pyridine and 1 ml. acetic anhydride is left standing at room temperature overnight. The mixture is evaporated to dryness in vacuo and the crystalline residue recrystallized from ethanol-ether, M. P. 177–180° C., $[\alpha]_D+137°$ (c, 0.39 in chloroform). Anal. $C_{21}H_{28}O_4$ (344.44) C, 73.22; H, 8.19. Found: C, 73.38; H, 8.09.

EXAMPLE 18

Following the fermentation and isolation processes of example 17, androstenedione is converted to 16α-hydroxy-Δ⁴-androstene-3,20-dione by the following microorganisms:

| | Yield percent |
|---|---|
| *S. Olivaceus* (Waksman No. 3688) | <1 |
| *S. viridis* (Waksman No. 3690) | 28 |

Testosterone has been converted to 16α-hydroxytestosterone by fermentation with *S. roseochromogenus*, *S. viridis*, and *S. olivaceus*.

Other media than those disclosed in the foregoing examples may be used for the purpose of this invention, the only requirement being of course that they be media which support the oxidizing growth of Streptomyces. The vitamin B–12 content of the media may be recovered by the conventional procedures for recovery from Streptomyces. An adequate (sterile) air supply should be maintained during the fermentation, which may be done in the conventional manner of conducting oxidizing fermentations, e. g., by exposure of a large surface of the medium to air or by submerged aerated culture. The incubation time may determine the degree of oxidation. Thus, pregnenolone appears to be oxidized first to progesterone and on further incubation the latter is converted to 16α-hydroxyprogesterine. The incubation may of course be stopped at a time when the medium contains the highest titer of progesterone, if that is the desired product.

The 16α-hydroxy-desoxycorticosterone, produced in Examples 6, 14, 15 and 16, may be converted to its corresponding carboxylic acid ester by acylating as illustrated in the following examples:

EXAMPLE 19

*The diacetate of 16α-hydroxy-desoxycorticosterone*

The diacetate of 16α-hydroxy-11-desoxycorticosterone is prepared by treating 10 mg. of said material with pyridine and acetic anhydride. Recrystallization of the crude acetylation product from acetone-hexane gives needles of M. P. 151–153° C. $[\alpha]_D^{23}+105°$ (c, 0.46 in chloroform). Anal. calcd. for: $C_{25}H_{36}O_6$ (430.52): C, 69.74; H, 7.96. Found: C, 69.53; H, 8.25.

EXAMPLE 20

*The 21 - mono - benzoate of 16α - hydroxy - desoxycorticosterone*

166 mg. of 16α-hydroxy-11-desoxycorticosterone are dissolved in 2 ml. of dry pyridine, cooled to 5° C. and reacted with 80 mg. of benzoyl chloride (1:1 equivalents) in 2 ml. of chloroform. The mixture is left standing overnight in an ice-box. The excess benzoyl chloride is destroyed with ice and after dilution with chloroform the resulting solution is washed with dilute hydrochloric acid, dilute sodium bicarbonate and finally with water. Evaporation of the chloroform in vacuo leaves about 215 mg. of a mixture consisting mainly of the desired 21-benzoate, as well as small amounts of unchanged starting materials and of its dibenzoate. To remove the unchanged starting material, the total mixture is dissolved in 10 ml. of dioxane and 200 mg. of $HIO_4 \cdot 2H_2O$ in 2 ml. of water are added. After standing overnight, the excess $HIO_4$ is destroyed by the addition of a few drops of glycerine, the mixture taken up in 40 ml. of chloroform and the water layer separated off. The chloroform-dioxane layer is extracted with a saturated sodium bicarbonate solution, washed with water, dried over sodium sulfate and evaporated to dryness in vacuo. The residue (about 187 mg.) after recrystallization from acetone-ether yields the pure 21–benzoate, M. P. 210–212° C.; $[\alpha]_D+129°$ (c=0.325 in chloroform), $$\lambda_{max.}^{Nujol}\ 2.90\mu$$

5.78$\mu$, 5.82$\mu$, 6.06$\mu$, 6.23$\mu$, 6.33$\mu$, 14.04$\mu$. Anal. calcd. for: $C_{28}H_{34}O_5$ (450.55): C, 74.64; H, 7.61. Found: C, 74.43; H, 7.81.

EXAMPLE 21

*The 21-mono-acetate of 16α-hydroxy-desoxycorticosterone*

To a solution of 370 mg. of 16α-hydroxy-11-desoxycorticosterone in 5 ml. of dry pyridine is added 125 mg. of acetic anhydride in 5 ml. of pyridine. After standing at room temperature for four hours, the mixture is evaporated to dryness in vacuo leaving a residue weighing about 407 mg. This residue consists mainly of the desired 16α-hydroxy-desoxycorticosterone-21-acetate [Δ⁴-pregnene-16α,21-diol-3,20-dione 21-acetate] contaminated by some unchanged starting material and some 16α,21-diacetate. To remove the unchanged starting material the mixture is dissolved in 15 ml. dioxane and oxidized with 450 mg. of the $HIO_4 \cdot 2H_2O$ in 5 ml. of water. After 12 hours at room temperature excess periodic acid is destroyed with a few drops of glycerine and the solution is diluted with an equal volume of chloroform. The aqueous layer is removed and the chloroform dioxane washed with saturated bicarbonate and with water. After evaporation of the solvents, about 294 mg. of crystalline acetates are obtained.

A small sample of the above mixture of 21-monoacetate and of 16α,21-diacetate is recrystallized three times from acetone hexane and yields the monoacetate, M. P. 206–208.5° C., $[\alpha]_D+112°$ (c=0.31 in chloroform);

$$\lambda_{max.}^{ethanol}\ 239\ m\mu$$

($\epsilon$=18,200). Anal. calcd. for $C_{23}H_{32}O_5$ (388.49): C, 71.10; H, 8.30. Found: C, 71.30; H, 8.17.

16α-hydroxyprogesterone may be oxidized by means of an Aspergillus as disclosed in the application of Fried et al., Serial No. 296,256, filed June 28, 1952, and the oxygenated products thus produced may be further treated to form the known steroids: allopregnane-3,6,20-trione (if the fungus is *Asperigillus nidulans*), and pregnane- 3,11,20-trione (11-keto pregnanedione) (if the fungus is *Aspergillus niger*), as more fully disclosed by the following schematic analysis:

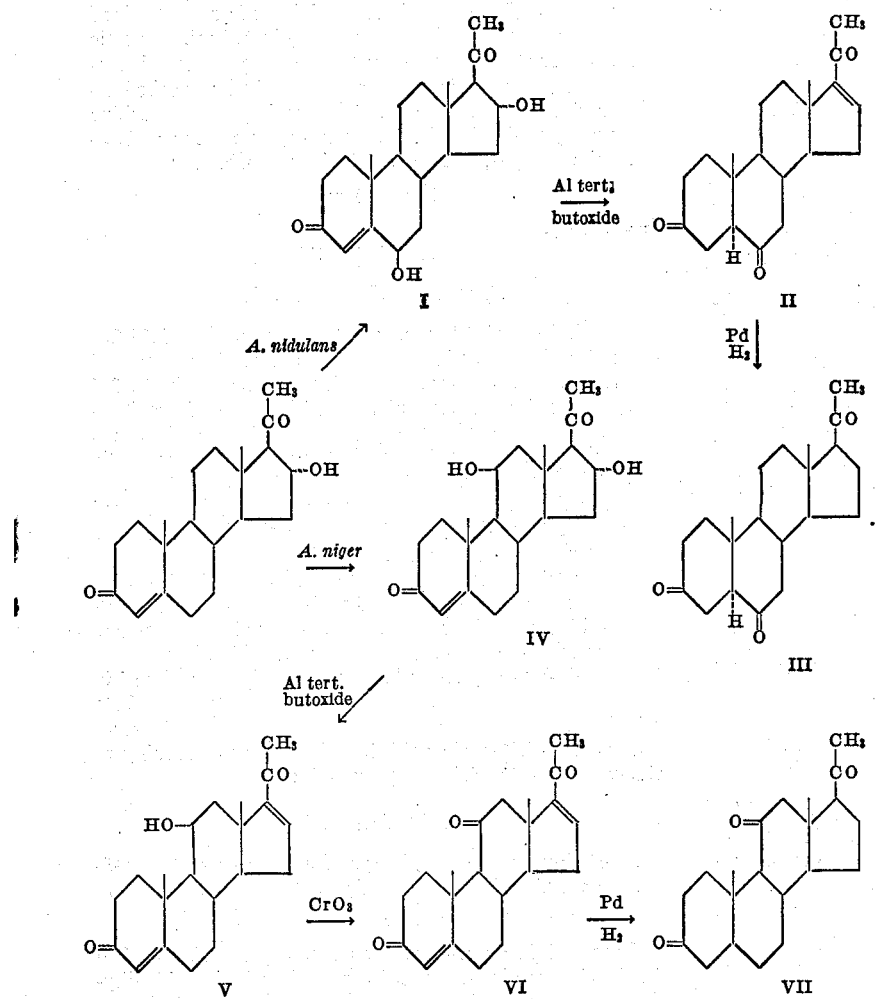

EXAMPLE 22

6β,16α-dihydroxyprogesterone (I) by fermentation of 16α-hydroxyprogesterone with Aspergillus nidulans An aqueous medium of the following composition is prepared:

| | |
|---|---|
| Cornsteep liquor solids | g-- 3.0 |
| $NH_4H_2PO_4$ | g-- 3.0 |
| $CaCO_3$ | g-- 2.5 |
| Soybean oil | g-- 2.2 |
| 16α-hydroxyprogesterone | g-- 0.3 |
| Water | liter-- 1 |

The pH of the medium is adjusted to 7.0±0.1. 100 ml. portions of the medium are distributed in 500 ml. Erlenmeyer flasks, and the flasks are plugged with cotton and sterilized in the usual manner (by autoclaving). When cool, each of the flasks is inoculated with 5–10% of a vegetative inoculum of *Aspergillus nidulans*, which has been grown for 48–72 hours on a cornsteep liquor solids-brown sugar medium, and the flasks are maintained at 25° C. and mechanically shaken. After 3 days of fermentation, the contents of the flasks are pooled, acidified to pH 4±0.2 with sulfuric acid, and filtered, thus separating the mycelium from the fermented medium. The steroids are removed by extracting the filtrate with chloroform.

From 850 mg. of 16α-hydroxyprogesterone, about 827 mg. of crude fat-free steroids are obtained. Crystallization from acetone affords 6β,16α-dihydroxyprogesterone (I) in about 30% yield: M. P. 230–232° C.; $[\alpha]_D^{24}+75°$ (c, 1.0 in chloroform);

$$\lambda_{max.}^{alc.} \ 235 \ m\mu$$

($\epsilon$=10,800)

$$\lambda_{max.}^{Nujol} \ 2.91\mu$$

(OH); 5.90μ and 5.95μ (20-ketone); 6.00μ, 6.04μ and 6.16μ ($\Delta^4$-3-ketone).

An additional amount of pure material is obtained by chromatography of the mother liquors on sulfuric acid-washed alumina.

EXAMPLE 23

$\Delta^{16}$-allopregnene-3,6-20-trione (II)

To a solution of 6β,16α-dihydroxyprogesterone (102 mg.) in 15 ml. of toluene and 3 ml. of cyclohexanone, which had been thoroughly dried by distilling off about 5 ml. of toluene are added 300 mg. of aluminum tert. butoxide. The resulting solution is refluxed for ½ hour. To the cooled mixture is added 2 N-hydrochloric acid and chloroform. The chloroform phase is extracted successively with 2 N acid, bicarbonate and water and dried over sodium sulfate. Evaporation of the solvent and excess cyclohexanone in high vacuum leaves a residue (about 594 mg.) which still contains high boiling condensation products of cyclohexanone. The oil is dissolved in 15 ml. of benzene and 3 ml. of hexane and chromatographed on sulfuric acid-washed alumina. The first 15 ml. elutes mainly oil material followed in the next 360 ml. by a crystalline fraction (about 60 mg.), which after recrystallization from acetone-hexane melts at 204–211° C. $[\alpha]_D^{24}+33$ (c, 0.65 in chloroform);

$$\lambda_{max.}^{alc.}\ 237\ m\mu$$

($\epsilon$=9,500). Anal. calcd. for $C_{21}H_{28}O_3$ (328.43): C, 76.79; H, 8.59. Found: C, 76.83; H, 8.46.

EXAMPLE 24

Allopregnane-3,6,20-trione (III)

A solution of 21 mg. of $\Delta^{16}$-allopregnene-3,6,20-trione (II) in 2 ml. of glacial acetic acid is hydrogenated in the presence of 15 mg. of Pd-black. After 30 minutes 3.5 ml. (about 2 mole equivalents) of hydrogen have been absorbed. To reoxidize any secondary hydroxyl groups that might be formed in the reduction the acetic acid solution is treated with 5 mg. of $CrCo_3$ in 1 ml. of acetic acid for 30 minutes. The excess $CrO_3$ is destroyed by the addition of methanol and the oxidation mixture is concentrated to small volume. The residue is distributed between chloroform and water, the chloroform solution extracted with dilute bicarbonate and water and the solvent removed in vacuo. The resulting crystalline residue after recrystallization from acetone melts at 223–228° C.

The melting point is not depressed on admixture of authentic allopregnane-3,6,20-trione of M. P. 224–230° C. and the infrared spectra of the two samples are identical.

EXAMPLE 25

11α,16α-dihydroxyprogesterone (IV) by fermentation of 16α-hydroxyprogesterone with Aspergillus niger The process of Example 22 is repeated using *Aspergillus niger* instead of *Aspergillus nidulans*. The contact period is increased to four days. One gram of 16α-hydroxyprogesterone yields about 982 mg. of fat-free steroids. Digestion with acetone affords a crystalline fraction (about 423 mg.), which after recrystallization from acetone melts at 213–215° C.; $[\alpha]_D^{23}+128°$ (c, 1.03 in chloroform);

$$\lambda_{max.}^{alc.}\ 240\ m\mu$$

($\epsilon$=14,400);

$$\lambda_{max.}^{Nujol}\ 2.98\mu$$

(OH), 5.86$\mu$ (20-ketone), 6.02$\mu$ and 6.19$\mu$ ($\Delta^4$-3-ketone). Anal. calcd. for $C_{21}H_{30}O_4$ (346.45): C, 72.80; H, 8.73. Found: C, 73.11; H, 8.79.

Crystallization of the mother liquors from the acetone digest yields some unchanged 16α-hydroxyprogesterone.

EXAMPLE 26

11α-hydroxy-16-dehydroprogesterone (V)

From a solution of 102 mg. of 11α,16α-dihydroxyprogesterone (IV) in 20 ml. of dry toluene 5 ml. of the solvent are distilled off to remove the last traces of moisture. After the addition of 300 mg. aluminum tert. butoxide the solution is refluxed for 30 minutes. After cooling 2 N CHl and chloroform are added. The chloroform-toluene extract is washed with 2 N hydrochloric acid, water, dilute bicarbonate and again water and then evaporated to dryness in vacuo. The residue (about 96 mg.) on crystallization from acetone-hexane yields clusters of needles melting at 169–174° C.; $[\alpha]_D^{24}+138°$ (c, 0.56 in chloroform);

$$\lambda_{max.}^{alc.}\ 239\ m\mu$$

($\epsilon$=21,900). Anal. calcd. for $C_{21}H_{28}O_3$ (328.43): C, 76.79; H, 8.59. Found: C, 76.67; H, 8.59.

EXAMPLE 27

$\Delta^{4,16}$-pregnadiene-3,11,20-trione (VI)

To a solution of 16.8 mg. of 11α-hydroxy-16-dehydroprogesterone (V) in 1 ml. of glacial acetic acid is added dropwise a solution of 5 mg. of $CrO_3$ in 1.5 ml. of acetic acid. After standing at room temperature for 15 minutes methanol (1.0 ml.) is added and the solution worked up as described in Example 24. The semicrystalline residue after recrystallization from acetone-hexane melts at 179–183° C.; $[\alpha]_D^{24}+246°$ (c, 0.85 in chloroform);

$$\lambda_{max.}^{alc.}\ 235\ m\mu$$

($\epsilon$=21,800).

EXAMPLE 28

Pregnane-3,11,20-trione (VII)

A solution of 11 mg. of $\Delta^{4,16}$-pregnadiene-3,11,20-trione (V) in 2 ml. of glacial acetic acid was hydrogenated in the presence of 9 mg. of Pd-black. After an hour, 3.5 ml. (about 4 mole equivalents) of hydrogen have been absorbed. To reoxidize any secondary hydroxyl groups that might have been formed in the reduction, the acetic acid solution is treated with 3 mg. of $CrO_3$ in 1 ml. of acetic acid for 30 minutes. The excess $CrO_3$ is destroyed by the addition of methanol and the oxidation mixture is worked up as described in Example 24.

The melting point of authentic pregnane-3,11,20-trione was not depressed when mixed with the resulting crystalline residue after it has been recrystallized from acetone and the infra-red spectra of the two are identical.

The 16α-hydroxy-$\Delta^4$-androstene-3,17-dione produced in Examples 8, 20, and 21 may be degraded to $\Delta^4$-3-keto etiobilienic acid dimethyl ester ($\Delta^4$-3-keto-16,17-secoandrostene-16,17-dioic acid dimethyl ester) according to the method of the following example:

EXAMPLE 29

Degradation of 16α-hydroxyandrostenedione to $\Delta^4$-3-keto-etiobilienic acid dimethyl ester ($\Delta^4$-3-keto-16,17-secoandrostene-16,17-dioic acid dimethyl ester)

60 mg. of 16α-hydroxyandrostenedione are dissolved in 2 ml. of pure dioxane and 60 mg. of periodic acid dihydrate in 0.5 ml. of water are added. After standing at room temperature overnight, a drop of glycerin is added followed by 10 ml. of chloroform. The aqueous layer is separated off and the chloroform phase washed with water. Evaporation of the chloroform yields about 67 mg. of an oil. This oil, which represents $\Delta^4$-3-keto-16,17-secoandrosten-16-al-17-oic acid, is dissolved in 2 ml. of glacial acetic acid and 0.4 ml. of a solution of $CrO_3$ in glacial acetic acid (50 mg./ml.) are added gradually. After 15 minutes the excess $CrO_3$ is destroyed with ethanol, the solvent removed in vacuo and the residue taken up in chloroform. The chloroform solution is extracted with $NaHCO_3$, and the latter extract after acidification with dilute acid is extracted with ether. The ether solution on evaporation yields about 52 mg. of an oil, which is esterified with diazo-methane in ether. After evaporation of the ether, the oily residue is chromatographed on 1 g. of $Al_2O_3$ (pH 4.5). The column is first washed with 75 ml. of 10% benzene-hexane, 75 ml. of 20% benzene-hexane and 100 ml. of 50% benzene-hexane, which elutes a total of about 7 mg. of oily material. 150 ml. of benzene then elutes about 15 mg. of crystalline material, which after recrystallization from hexane gives long needles, M. P. 97–99° C., $[\alpha]_D+27°$ (c, 0.34 in chloroform), $$\lambda_{max.}^{EtOH}\ 239\ m\mu$$

($\epsilon$=17,850), 315 m$\mu$ ($\epsilon$=92).

The substance is identified as $\Delta^4$-3-keto-etiobilienic acid dimethyl ester ($\Delta^4$-3-keto-16,17-secoandrostene-16,17-dioic acid dimethyl ester) by comparison with an authentic sample of this substance prepared as described in the following example.

EXAMPLE 30

*Oppenauer oxidation of $\Delta^5$-3$\beta$-hydroxyetiobilienic acid dimethyl ester*

A solution of 150 mg. of $\Delta^5$-3$\beta$-hydroxyetiobilienic acid dimethyl ester in 3 ml. of cyclohexanone and 10 ml. of toluene is distilled until a total of 3 ml. of distillate have collected. To the thus dried distillation residue is added 100 mg. of aluminum tertiary butoxide and the mixture refluxed for 15 minutes. The reaction mixture is partitioned between chloroform and dilute hydrochloric acid and the chloroform extract washed with water, dilute bicarbonate and again with water. The chloroform solution is dried over sodium sulfate and evaporated to dryness in vacuo. The residue (about 287 mg.) is dissolved in 2 ml. benzene and 6 ml. hexane and chromatographed on three grams of sulfuric acid washed alumina. The first 20 ml. of benzene-hexane 1:3 elutes about 125 mg. of oily condensation products of cyclohexanone, which is followed in the subsequent 330 ml. by about 63 mg. of crystalline material. Subsequent elution with benzene-hexane (1:1, 110 ml.; 3:1, 100 ml.) and benzene (225 ml.) affords additional amounts of crystalline material. Recrystallization of the combined crystalline fractions from hexane yields pure $\Delta^4$-3-ketoetiobilienic acid dimethyl ester, M. P. 100–101° C., $[\alpha]_D^{23}+26°$ (c, 0.78 in chloroform), $$\lambda_{max.}^{alc.} 238\ m\mu$$

($\epsilon = 16,500$), $$\lambda_{max}^{Nujol}\ 5.79\mu$$

6.03$\mu$, 6.20$\mu$. Anal. calcd. for $C_{21}H_{30}O_5$: C, 69.63; H, 8.28. Found: C, 69.67; H, 8.23.

The invention may be variously otherwise embodied within the scope of the appended claims.

We claim:
1. The method of converting a steroid into a 16$\alpha$-hydroxy derivative thereof, which comprises subjecting a steroid selected from the group consisting of a steroid of the pregnane series and a steroid of the androstane series to the action of enzymes of the microorganism of the class consisting of *Streptomyces roseochromogenus, Streptomyces viridis, Streptomyces olivaceus,* and *Streptomyces argenteolus,* under oxidizing conditions, and recovering the 16$\alpha$-hydroxy steroid formed.
2. The method of claim 1 wherein the steroid is of the pregnane series.
3. The method of claim 1 wherein the steroid is of the androstane series.
4. The method of claim 1 wherein the steroid is a 3-keto-steroid.
5. The method of claim 1 wherein the steroid is progesterone.
6. The method of claim 1 wherein the steroid is selected from the group consisting of desoxycorticosterone and esters thereof.
7. The method of claim 1 wherein the steroid is androstenedione.
8. The method of claim 1 wherein the steroid is testosterone.

References Cited in the file of this patent
UNITED STATES PATENTS

| | | |
|---|---|---|
| 2,602,769 | Murray et al. | July 8, 1952 |
| 2,709,705 | Perlman et al. | May 31, 1955 |

OTHER REFERENCES

Perlman, D., Titus, E., and Fried, J.: Jour., Am. Chem. Soc., 74, April 20, 1952, page 2126.
Perlman et al.: Science, 115, May 9, 1952, page 529.
Industrial and Engineering Chemistry, vol. 47, No. 9, Sept. 19, 1955, page 1862.